April 26, 1938.　　　O. C. TRAVER　　　2,115,596

AUTOMATIC RECLOSING CIRCUIT BREAKER SYSTEM

Filed June 6, 1936

Inventor:
Oliver C. Traver,
by Harry E. Dunham
His Attorney

Patented Apr. 26, 1938

2,115,596

UNITED STATES PATENT OFFICE 2,115,596

AUTOMATIC RECLOSING CIRCUIT BREAKER SYSTEM

Oliver C. Traver, Drexel Hill, Pa., assignor to General Electric Company, a corporation of New York Application June 6, 1936, Serial No. 83,916

5 Claims. (Cl. 175—294)

My invention relates to automatic reclosing circuit breaker systems, and particularly to a system for automatically reclosing a circuit breaker between two alternating current circuits, and one object of my invention is to provide an improved arrangement for preventing the circuit breaker from being reclosed as long as there is arcing on the faulty circuit.

A power arc produces a very ragged voltage characteristic, and this sputtering action has the effect of a high frequency relative to the normal frequency used for the transmission of power. In accordance with my invention, I cause these high frequency voltage pulsations produced by a power arc on a faulty circuit to control suitable means whereby the faulty circuit is prevented from being reconnected to its source of current until the arc has been extinguished.

My invention will be better understood from the following description when taken in connection with the accompanying drawing, and its scope will be pointed out in the appended claims.

Figure 1:
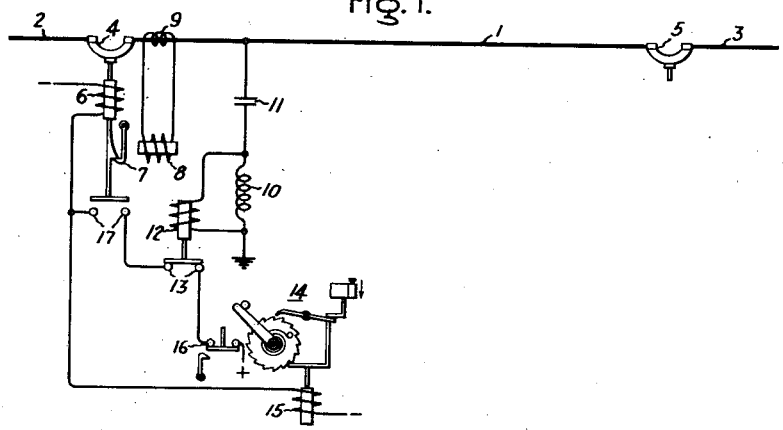
Figure 2:
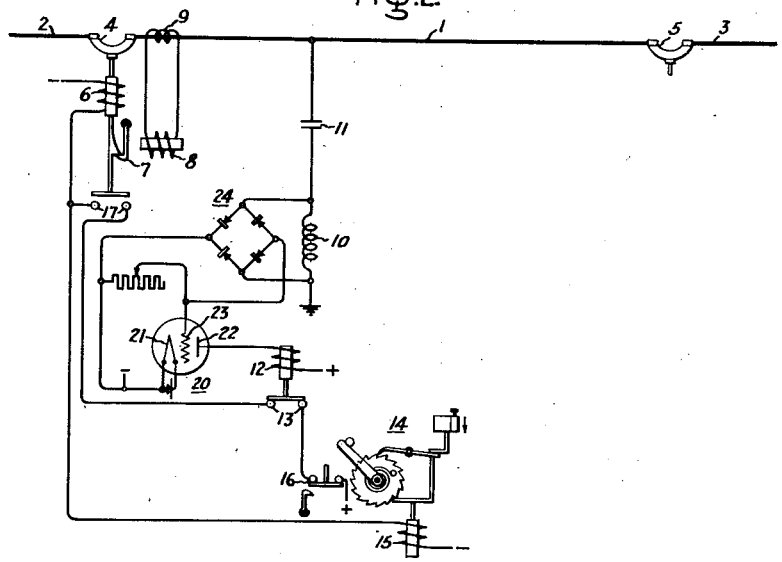

In the accompanying drawing, Fig. 1 diagrammatically illustrates an automatic reclosing circuit breaker system embodying my invention for controlling the reclosing of a circuit breaker between a single phase supply circuit and a single phase load circuit, and Fig. 2 illustrates a modification of the arrangement shown in Fig. 1.

Referring to Fig. 1, I represents a single phase circuit which is arranged to be connected to different supply circuits 2 and 3 by suitable circuit breakers 4 and 5, respectively. Each of these circuit breakers may be provided with similar control means, but in order to simplify the disclosure only the control circuits for the circuit breaker 4 are shown in detail.

The circuit breaker 4 is shown as a latched-in circuit breaker and is provided with a closing coil 6, which, when energized, closes the circuit breaker, a latch 7 for holding the circuit breaker in its closed position, and a trip coil 8, which, when sufficiently energized, releases the latch 7 and allows the circuit breaker 4 to open. Any suitable fault-responsive means, examples of which are well known in the art, may be provided for effecting the energization of the trip coil 8 to open the circuit breaker 4. In the particular arrangement shown in the drawing, the trip coil 8 is connected to the secondary winding of a current transformer 9, the primary of which is connected in series with the circuit I when the circuit breaker 4 is closed.

In order to determine when there is an arc connected to the circuit I, I connect a reactor 10 in series with a suitable capacitor 11 across the circuit I. I also connect across the reactor 10 a suitable voltage drop responsive means, such as a relay 12. This relay has its contacts 13 connected in the circuit of the closing coil 6 of the circuit breaker 4 so that the closing coil circuit is maintained open as long as the voltage drop across the reactor 10 is above a predetermined value. Under normal conditions of voltage and frequency applied to the series circuit containing the reactor 10 and the capacitor 11, the voltage drop across the reactor 10 is so small that the relay 12 does not open its contacts 13. This is true with the line in service with both breakers 4 and 5 closed, and equally so if only one of the breakers is closed. However, when there is an arc connected to the circuit I, the high frequency voltage pulsations set up by this arc produce a sufficient drop across the reactor 10 to cause the relay 12 to pick up and open its contacts 13, notwithstanding the fact that the voltage impressed across the circuit I at this time may be considerably below its normal value. As soon as the arc is extinguished whether by reason of the opening of both circuit breakers or by any natural cause, then in the absence of the higher frequency impulses, relay 12 will drop down to close its contacts 13 and allow the circuit breaker to reclose.

Also in order to limit the number of times the circuit breaker 4 can reclose on a fault, I provide a suitable notching relay 14 which has its operating winding 15 connected in parallel with the closing coil 6 and its normally closed contacts 16 connected in the energizing circuit of the closing coil 6 and in its own operating winding 15. The relay 14 is arranged to open its contacts 16 when its winding 15 has been energized a predetermined number of times. Any other suitable means, examples of which are well known in the art, may be provided for limiting the number of times the circuit breaker 4 can reclose.

The operation of the arrangement shown in Fig. 1 is as follows: When the circuit breaker 4 is closed and a fault occurs on the circuit I so that an abnormally large current flows through the primary winding of the current transformer 9, the trip coil 8 becomes sufficiently energized to release the latch 7 so as to effect the opening of the circuit breaker 4. If the fault is due to an arc on the circuit I, the voltage pulsations produced by this arc will cause the relay 12 to open its contacts 13 so that when the circuit breaker 4 opens and closes its auxiliary contacts 17, the circuit of the closing coil 6 is open at the contacts 13 of relay 12. As long as the arc is sustained on the circuit 1, the relay 12 prevents the circuit of closing coil 6 from being completed. However, as soon as the arc has been extinguished, as a result of the opening of the circuit breaker 5, or by any natural cause, the voltage drop across the reactor 10 decreases below the drop-out value of the relay 12 so that it closes its contacts 13 and completes the energizing circuit for the closing coil 6 through the auxiliary contacts 17 on the circuit breaker 4 and the contacts 16 of the notching relay 14. If the circuit breaker fails to remain closed, the above cycle of operation is repeated a predetermined number of times until the notching relay 14 has been energized a sufficient number of times to open its contacts 16, which are manually reset contacts.

In the modification shown in Fig. 2, I have interposed between the relay 12 and the reactor 10 a suitable electronic device 20 comprising a cathode 21, an anode 22, and controlling electrode 23. The controlling electrode 23 is connected through suitable rectifying means 24 to the reactor 10 so that when the voltage drop across the reactor 10 is above a predetermined value, sufficient current passes through the plate circuit of the electronic device 20 to operate the relay 12, which is connected in this circuit.

The operation of the arrangement shown in Fig. 2 is substantially the same as that of Fig. 1 and will be obvious to those skilled in the art.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent in the United States is:

1. In combination, two electric circuits, a circuit breaker interconnecting said circuits, means for opening said circuit breaker, and means dependent upon the voltage pulsations produced in one of said circuits when an arc is connected thereto for controlling the reclosing of said circuit breaker.

2. In combination, two electric circuits, a circuit breaker interconnecting said circuits, means responsive to a fault on one of said circuits for effecting the opening of said circuit breaker, and means dependent upon the voltage pulsations produced in one of said circuits when an arc is connected thereto for effecting the reclosing of said circuit breaker when the frequency of said voltage pulsations is below a predetermined value.

3. In combination, two electric circuits, a circuit breaker interconnecting said circuits, means responsive to a fault on one of said circuits for effecting the opening of said circuit breaker, a capacitor and reactor connected in series to said one of said circuits, and means responsive to the voltage drop across said reactor for controlling the reclosing of said circuit breaker.

4. In combination, two electric circuits, a circuit breaker interconnecting said circuits, means responsive to a fault on one of said circuits for effecting the opening of said circuit breaker, a capacitor and reactor connected in series to said one of said circuits, electronic means connected to said reactor so that the current flow through said electronic means depends upon the voltage drop across said reactor, and means controlled by the current flow through said electronic means for closing said circuit breaker.

5. In combination, two electric circuits, a circuit breaker interconnecting said circuits, means for opening said circuit breaker, means dependent upon the voltage pulsations produced in one of said circuits when an arc is connected thereto for controlling the reclosing of said circuit breaker, and means for limiting the number of reclosures of said circuit breaker to a predetermined number.

OLIVER C. TRAVER.